United States Patent [19]
Yanagisawa et al.

[11] Patent Number: 5,386,411
[45] Date of Patent: Jan. 31, 1995

[54] RECORDABLE OPTICAL DISK AND METHOD OF MANUFACTURING THE SAME

[75] Inventors: Shuichi Yanagisawa; Satoru Tanaka; Fumio Matsui, all of Tsurugashima, Japan

[73] Assignee: Pioneer Electronic Corporation, Tokyo, Japan

[21] Appl. No.: 154,275

[22] Filed: Nov. 18, 1993

[30] Foreign Application Priority Data

Nov. 24, 1992 [JP] Japan .................................. 4-313460

[51] Int. Cl.⁶ ............................................. G11B 7/24
[52] U.S. Cl. .................... 369/275.4; 369/277; 369/278; 369/100; 369/44.26
[58] Field of Search ............... 369/275.4, 275.1, 275.5, 369/284, 100, 105, 109, 277, 278, 44.26

[56] References Cited

U.S. PATENT DOCUMENTS

| | | | |
|---|---|---|---|
| 4,547,875 | 10/1985 | Ohta et al. | 369/109 |
| 4,556,967 | 12/1985 | Braat | 369/275.4 |
| 4,984,232 | 1/1991 | Utsumi et al. | 369/277 |
| 5,144,552 | 9/1992 | Abe | 369/275.4 |
| 5,325,353 | 6/1994 | Sasaui et al. | 369/275.1 |

*Primary Examiner*—Eugene R. LaRoche
*Assistant Examiner*—Tan Nguyen
*Attorney, Agent, or Firm*—Kane, Dalsimer, Sullivan, Kurucz, Levy, Eisele and Richard

[57] ABSTRACT

Information is optically recorded to a recordable optical disk by a light beam, and a return light is received from the recordable optical disk to produce a tracking error signal. The recordable optical disk includes: a substrate having a disk shape; a groove formed on a surface of the substrate along a predetermined track which the light beam is made to follow; and a recording layer formed on the surface of the substrate, to which the information is recorded by the light beam. A depth of the groove is prescribed such that an amount of the return light from the groove becomes smaller than an amount of the return light from the portion of the recording layer other than the groove in a condition after recording.

10 Claims, 4 Drawing Sheets

RELATIONSHIP BETWEEN RF SIGNAL AND TRACKING ERROR SIGNAL IN OPTICAL DISK OF EMBODIMENT

RELATIONSHIP BETWEEN AVERAGE RF SIGNAL
AT GROOVE PORTION AND RF SIGNAL AT LAND PORTION

RELATIONSHIP BETWEEN RF SIGNAL AND TRACKING ERROR SIGNAL IN ORDINARY LD

RELATIONSHIP BETWEEN RF SIGNAL AND TRACKING ERROR SIGNAL IN R-LD

RECORDABLE OPTICAL DISK AND METHOD OF MANUFACTURING THE SAME

BACKGROUND OF THE INVENTION

1. Field of the Invention

The present invention is related with an optical disk of recordable type, and more particularly, an optical disk of recordable type to which information can be recorded by use of a light beam.

2. Description of the Related Art

An optical disk player, for example, a laser disk (LD) player, reads information recorded on a LD by irradiating a light beam to the LD and receiving the reflected light which is modulated by the pit array of the LD.

The light beam is made to follow the pit array in case of optically reading the pit array on the disk in the above-mentioned LD player, so that a tracking control is performed.

In this tracking control, a tracking error signal is generated on the basis of the reflected light from the disk. The light beam is made to follow the pit array at a zero-crossing point when the polarity of the tracking error signal changes from plus (+) to minus (−).

In an ordinary LD to which the information is recorded beforehand, the intensity of the reflected light is low at the pit array of the disk, while the intensity of the reflected light is high between the pit arrays of the disk. Accordingly, it becomes possible to make the light beam follow the pit array at the zero-crossing point when the tracking error signal changes from plus (+) to minus (−), as mentioned above.

Namely, the ordinary LD, the CD (Compact Disk) and the R-CD (Recordable CD), are the recording medium of High-to-Low type in which the intensity of the reflected light is low at the pit array, and with respect to which the tracking control is performed by making the light beam follow the pit array at which the intensity of the reflected light is low.

Apart from that, there is a recordable LD (it is referred as a R-LD, hereinbelow), to which recording is arbitrarily enabled according to a demand of a user. In the R-LD in which the phthalocyanine dye, for example, is used as a recording layer, the intensity of the reflected light is high at the groove portion (i.e. the recording portion) of the disk, while the intensity of the reflected light is low between the groove portions of the disk, on the contrary to the aforementioned ordinary LD. Thus, the light beam cannot be made to follow the groove portion at the same zero-crossing point when the tracking error signal changes from plus (+) to minus (−) as in the case of the aforementioned ordinary LD.

Namely, the R-LD is the recording medium of Low-to-High type, in which the intensity of the reflected light is high at the groove portion. In this case, if the tracking servo were closed at the portion where the intensity of the reflected light is low, in the same manner as the ordinary LD, the light beam would follow the land portion between the groove portions, so that the tracking control on the groove cannot be performed, In this manner, the tracking polarity at the time of tracking control of this R-LD type is reverse to that of the ordinary LD. Consequently, there is a problem that the R-LD cannot be reproduced by a player for the ordinary LD.

Instead, the R-LD requires an exclusive player to deal with the reverse tracking polarity.

SUMMARY OF THE INVENTION

It is therefore an object of the present invention to provide a recordable optical disk and a method of manufacturing the same, which can be reproduced by a player having an ordinary tracking polarity.

The above object of the present invention can be achieved by a recordable optical disk, to which information is optically recorded by a light beam, and from which a return light is received to produce a tracking error signal. The recordable optical disk includes: a substrate having a disk shape; a groove formed on a surface of the substrate along a predetermined track which the light beam is made to follow; and a recording layer formed on the surface of the substrate, to which the information is recorded by the light beam. A depth of the groove is prescribed such that an amount of the return light from the groove becomes smaller than an amount of the return light from the portion of the recording layer other than the groove in a condition after recording.

According to the recordable optical disk of the present invention, the recordable optical disk is constructed such that the amount of the return light, which has returned from the groove portion after recording, becomes smaller than that from the portions of the recording surface other than the groove portion such as a land portion. This characteristic of the return light, is the same as the characteristic of the ordinary optical disk (LD, CD, R-CD). Therefore, the recordable optical disk of the present invention can be reproduced by the player having the ordinary tracking polarity.

The above object of the present invention can be also achieved by a method of manufacturing a recordable optical disk, to which information is optically recorded by a light beam and from which a return light is received to produce a tracking error signal. The manufacturing method includes the steps of: preparing a substrate having a disk shape; forming a groove on a surface of the substrate along a predetermined track which the light beam is made to follow; and forming a recording layer on the surface of the substrate, to which the information is recorded by the light beam. A depth of the groove is prescribed such that an amount of the return light from the groove becomes smaller than an amount of the return light from the portion of the recording layer other than the groove in a condition after recording.

According to the manufacturing method of the present invention, the above mentioned recordable optical disk of the present invention can be manufactured, which is reproduced by the player having the ordinary tracking polarity.

The nature, utility, and further features of this invention will be more clearly apparent from the following detailed description with respect to preferred embodiments of the invention when read in conjunction with the accompanying drawings briefly described below.

DETAILED DESCRIPTION OF THE PREFERRED EMBODIMENTS

The inventors have investigated the aforementioned problem that the R-LD cannot be reproduced by the player for the ordinary LD.

First of all, the problem will be explained hereinbelow in more detail with referring to FIGS. 4 and 5, based on the investigation by the inventors.

Figure 4:
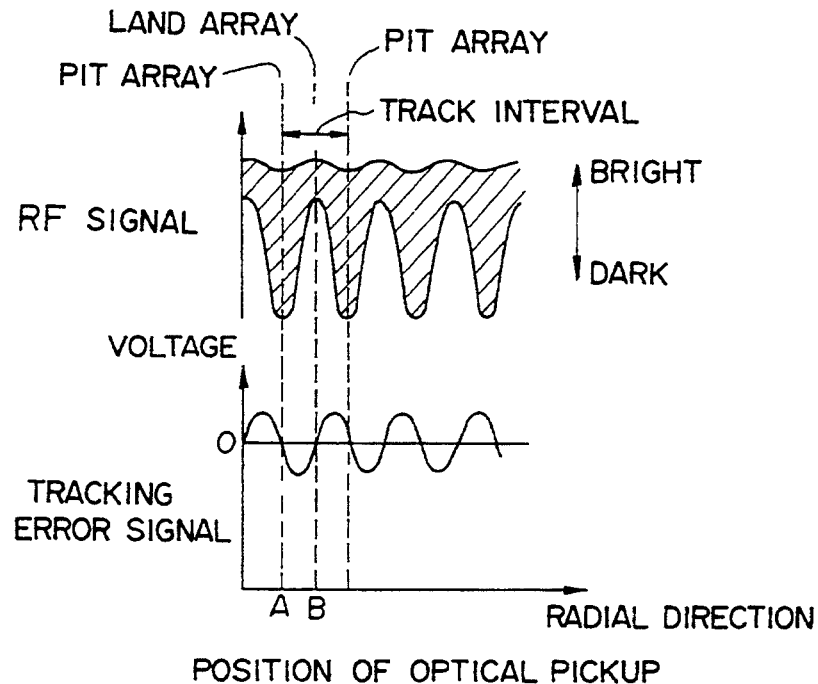
FIG. 4 is a diagram showing the relationship between the RF signal and the tracking error signal in the ordinary LD.

FIG. 4 shows the relationship between a RF (Radio Frequency) signal and a tracking error signal in case of the ordinary LD.

if the optical pickup is moved in the radial direction in a condition where the tracking servo is opened, the tracking error signal and the RF signal shown in FIG. 4 are obtained in case of the ordinary LD signal, the intensity of the reflected light is low at the pit array (radial direction position A) of the disk, while the intensity of the reflected light is high between the pit arrays, i.e. the land portion (radial direction position B) of the disk. For this reason, if the tracking servo is closed at the zero-crossing point (position A) when the polarity of the tracking error signal changes from plus (+) to minus (−), the light beam can be made to follow the pit array.

Figure 5:
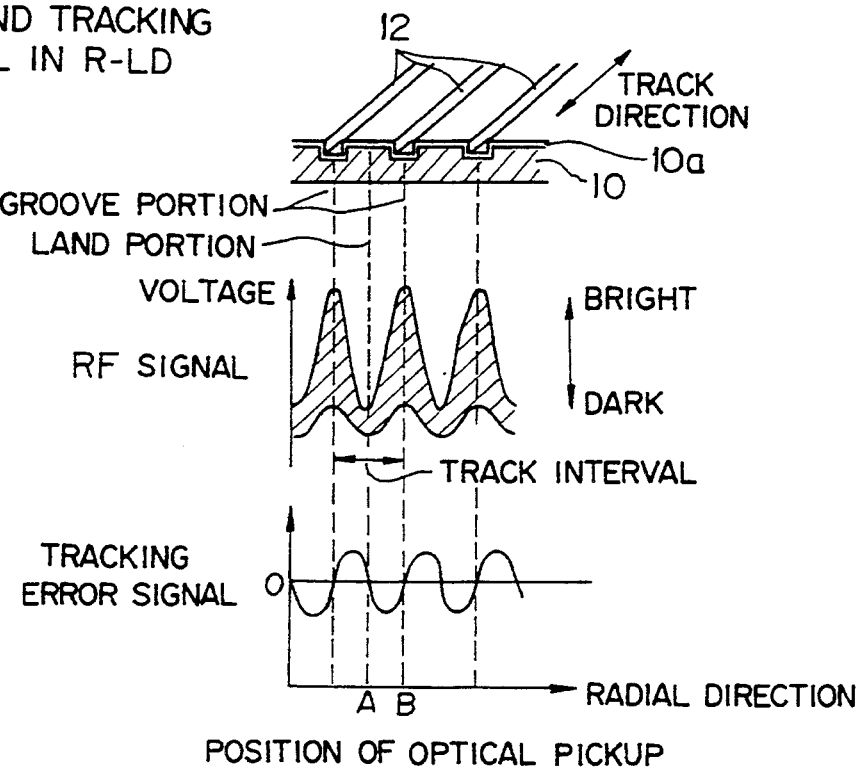
FIG. 5 is a diagram showing the relationship between the RF signal and the tracking error signal in the R-LD.

Nextly, FIG. 5 shows the relationship between the RF signal and the tracking error signal in case of the R-LD. If the optical pickup is moved in the radial direction in a condition where the tracking servo is opened, the waveforms of the tracking error signal and the RF signal shown in FIG. 5 are obtained. Here, the R-LD consists of a disk substrate 10 and a recording layer 10a disposed on the surface of the disk substrate 10. Grooves 12—12 are formed on the disk substrate 10 along the track which the light beam should be made to follow. The recording layer 10a is constituted so that the information is recorded when the light beam is irradiated thereto. As the material of such a recording layer, for example, phthalocyanine dye is used. The phthalocyanine dye is expressed by the following expressions.

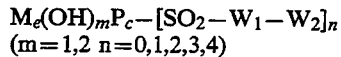

(m=1,2 n=0,1,2,3,4)

wherein $M_e$ is Si, Ge, V, Cu, Al, Co, Sn or none;

$P_c$ is phthalocyanine ring; and $W_1$, $W_2$ is alkyl group, alkoxy group or nitrogen-containing alkyl group.

In case of the R-LD which uses this phthalocyanine dye as the material for the recording layer, the intensity of the reflected light is high at the groove portion (radial direction position B) which is the recording portion of the disk, while the intensity of the reflected light is low between the groove portions i.e. the land portion (radial direction position A) of the disk on the contrary to the case of the aforementioned ordinary LD shown in FIG. 4. For this reason, if the tracking servo is closed at the zero crossing point (position A) when the polarity of the tracking error signal changes from plus (+) to minus (−) in the same manner as the ordinary LD, the light beam is made to follow the land portion between the groove portions, so that the tracking control cannot be performed.

In this manner, in case of the R-LD, the tracking polarity is opposite to that of the ordinary LD. Consequently, the R-LD cannot be reproduced by a player for the ordinary LD.

Nextly, the preferred embodiment of the present invention will be explained hereinbelow in detail, with referring to FIGS. 1 to 3.

Figure 1:
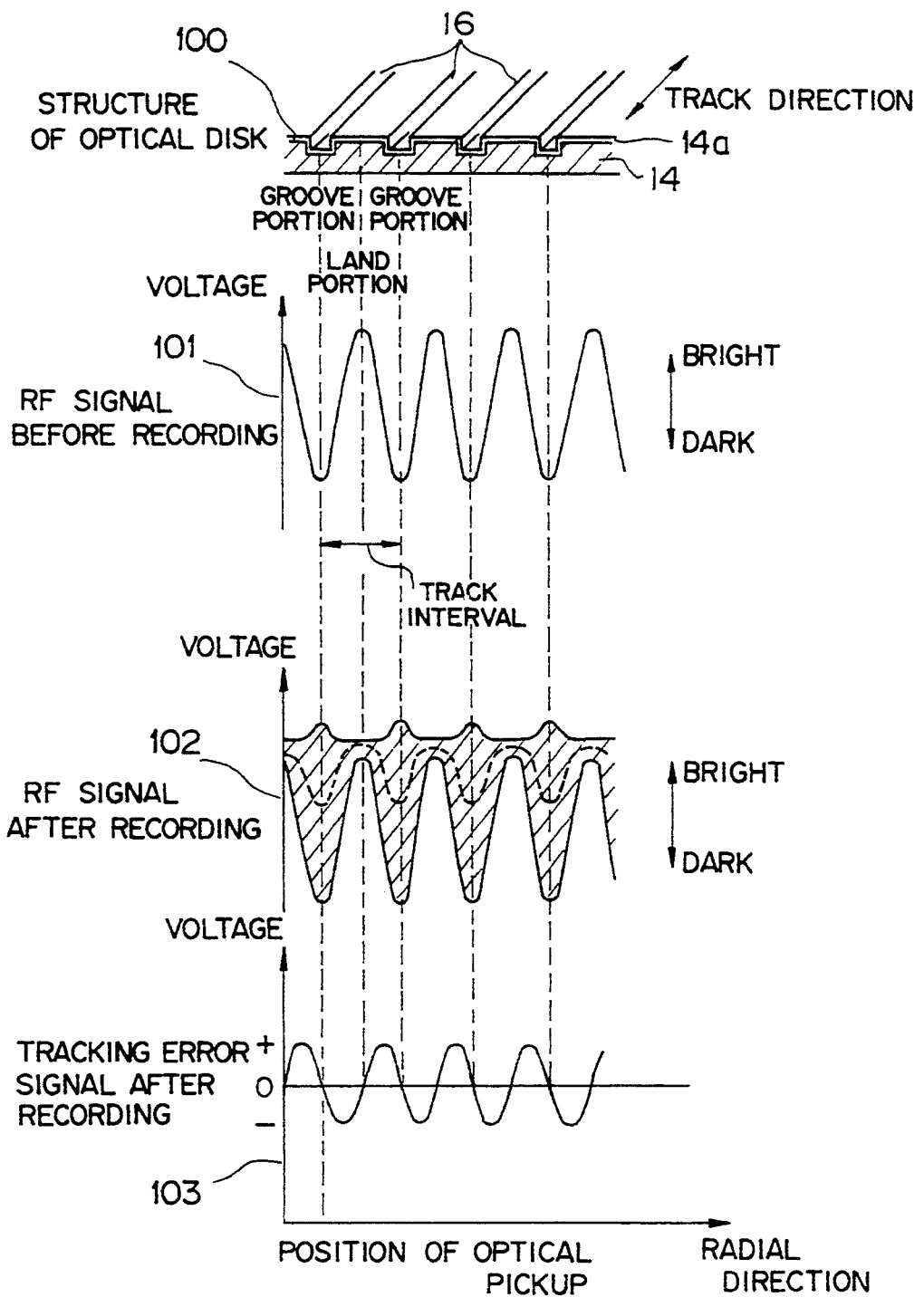
FIG. 1 is a diagram showing a relationship between a RF signal and a tracking error signal in an optical disk of the embodiment according to the present invention.

FIG. 1 shows the relationship between the RF signal and the tracking error signal, in the optical disk as one embodiment of the present invention. In FIG. 1, the reference numeral 100 denotes a structure of the disk, the reference numeral 101 denotes the RF signal before recording, the reference numeral 102 denotes the RF signal after recording, and the reference numeral 103 denotes the tracking error signal after recording.

As can be seen in the structure 100, the optical disk consists of a disk substrate 14, and a recording layer 14a disposed on the surface on the groove side of the disk substrate 14. Grooves 16—16 are formed on the disk substrate 14 along the track which the light beam should be made follow. The recording layer 14a is constructed such that the information is recorded when the light beam is irradiated thereto. The above mentioned phthalocyanine dye is, for example, used as the material of the recording layer 14a. Here, the depth of the grooves 16—16, is set such that the amount of the return light from the groove portion becomes less than that from the portion (land portion) of the surface of the disk other than the groove, after recording.

When the optical pickup is moved in the radial direction on the optical disk before recording in a condition where the tracking servo is opened, the waveform of the RF signal 101 shown in FIG. 1, is obtained. Here, the RF signal 101 at the groove portion is lower than the RF signal 101 at the land portion as clearly shown in FIG. 1.

When the optical pickup is moved in the radial direction on the optical disk after recording in a condition where the tracking servo is opened, the waveforms of the RF signal 102 and the tracking error signal 103, are obtained. Here, although the RF signal 102 at the groove portion becomes higher than the RF signal 101 at the groove portion before recording in FIG. 1, the RF signal 102 at the groove portion becomes lower than the RF signal 102 at the land portion.

Since the recording is not always continuously performed in the groove, but it is performed by forming the pits i.e. by recording the existence and none-existence of the pits in the groove, the relationship becomes like the dotted line shown in the RF signal 102, on the average. Therefore, the characteristic of the RF signal after recording becomes the same as the characteristic of the aforementioned ordinary LD of FIG. 4. The characteristic of the tracking error signal 103 after recording is the same as that of the aforementioned ordinary LD of FIG. 4. Namely, the polarity characteristic of the zero-crossing in the tracking error signal 103 is reverse to that of the tracking error signal in FIG. 5, and is the same as that in the tracking error signal in FIG. 4, which is the ordinary tracking polarity. Consequently, the optical disk of the present embodiment can be reproduced by a player having the ordinary tracking polarity.

Nextly, an experiment is performed with respect to such a depth of the groove portions 16—16 that the amount of return light from the groove portions 16—16 becomes smaller than the amount of the return light from the other portions.

Figure 2:
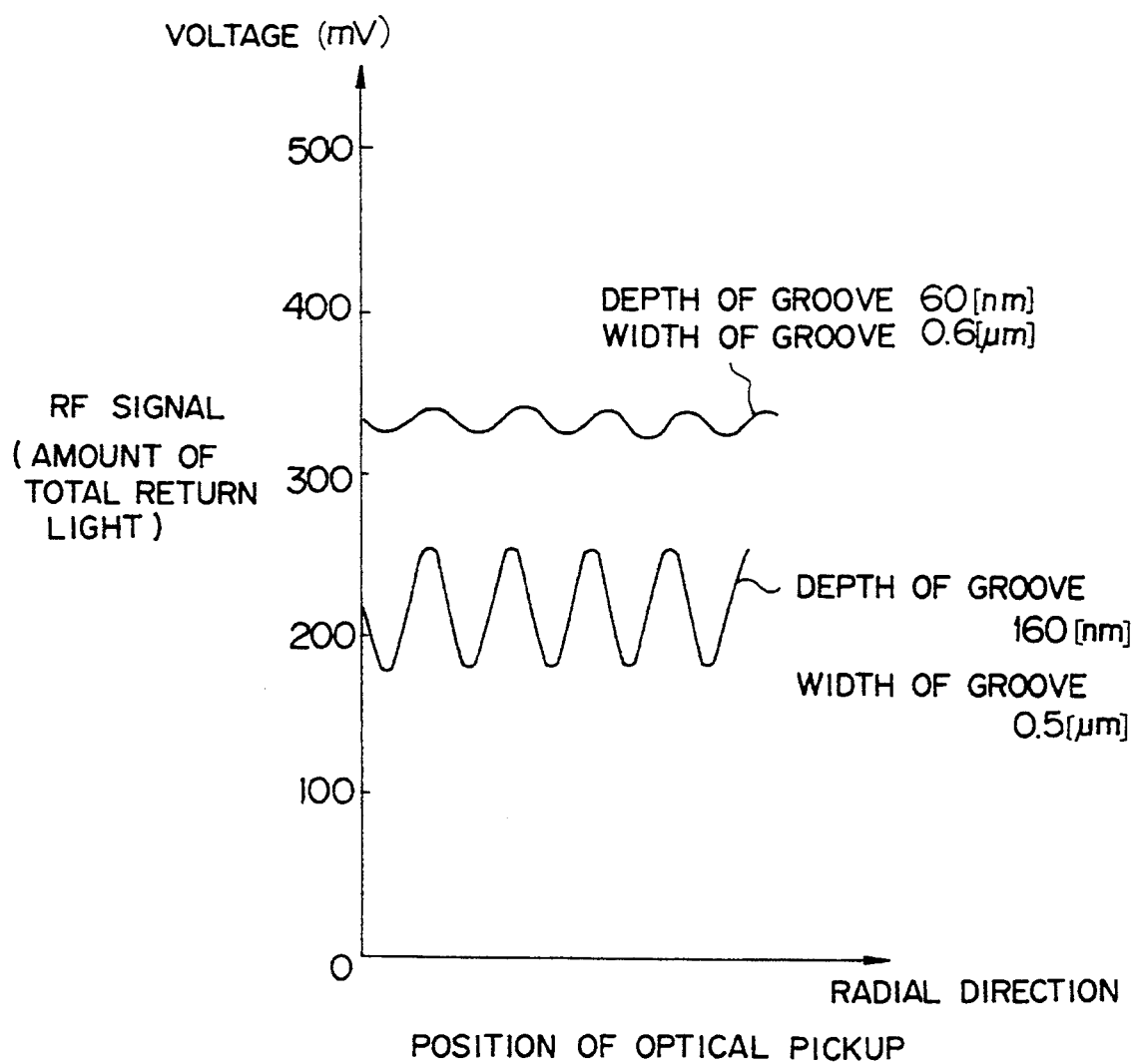
FIG. 2 is a graph showing a change of the RF signal due to the changes of the depth and the width of the groove.

FIG. 2 shows the variation of the RF signal due to the change of the depth and the width of the groove. In case of the groove which has the depth of 60 nanometers (nm) and the width of 0.6 micrometers (μm), the amplitude of the RF signal (the amount of the total return light) is small. In case of the groove which has the depth of 160 nanometers (nm) and the width of 0.5 micrometers (μm), the amplitude of the RF signal (the amount of the total return light) is large.

Figure 3:
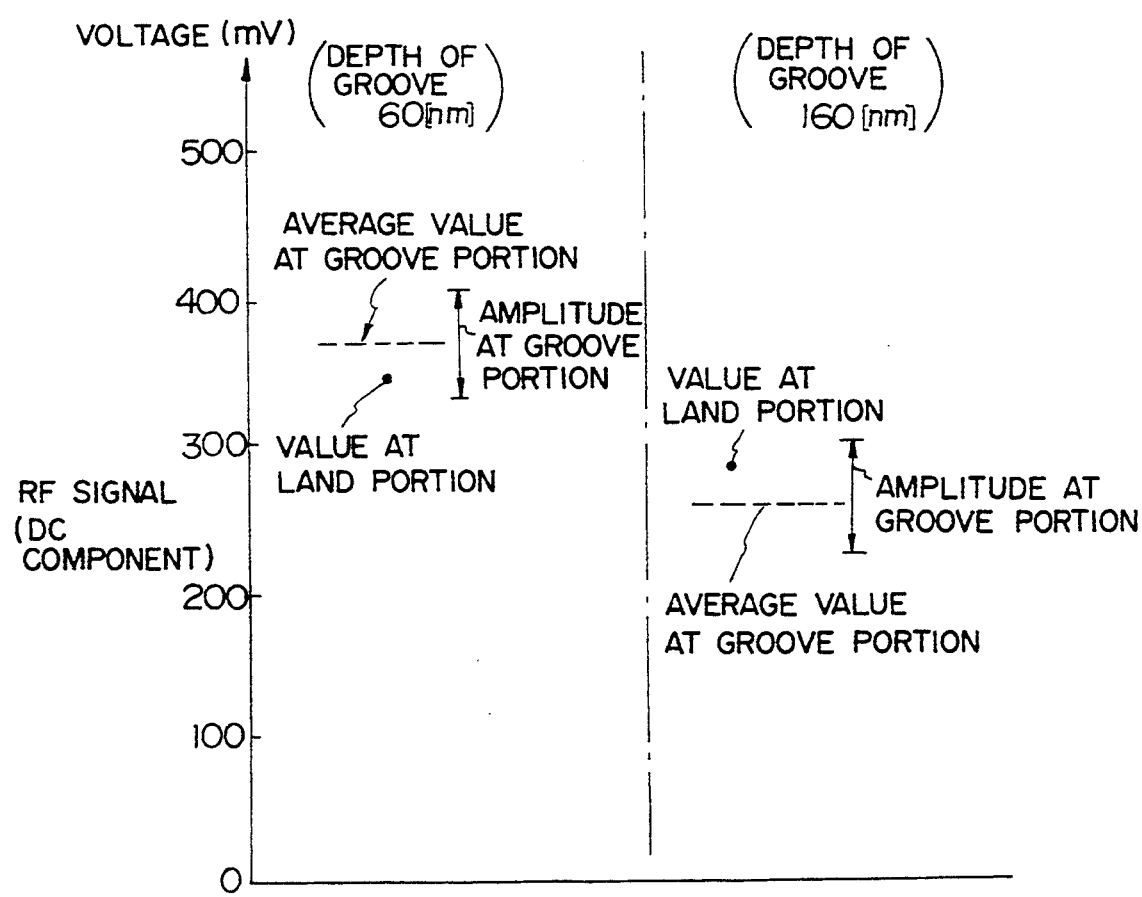
FIG. 3 is a graph showing a size relationship between the value of the average RF signal at the groove portion and the value of the RF signal at the land portion.

FIG. 3 shows the size relationship between the average value of the RF signal at the groove portion, and the value of the RF signal at the land portion after recording.

In FIG. 3, in case of the groove having the depth of 60 nm depth, the average value of the RF signal at the groove portion is larger than the value of the RF signal at the land portion. Therefore, this groove is not suitable as a groove for the optical disk of the present invention. On the other hand, in case of the groove having the depth of 160 nm, the average value of the RF signal at the groove portion is less than the RF signal at the land portion. Therefore, this groove is suitable as a groove for the optical disk of the present invention. In this manner, the amount of the return light from the groove can be made smaller than the amount of the return light from the land portion after recording by the optical disk to which the groove having the depth of 160 nm is formed.

As described above in detail, the optical disk of recordable type in the present embodiment can be reproduced by a player having the ordinary tracking polarity.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range equivalency of the claims are therefore intended to be embraced therein.

What is claimed is:

1. A recordable optical disk, to which information is optically recorded by a light beam and from which a return light is received to produce a tracking error signal, said recordable optical disk comprising:
   a substrate having a disk shape;
   a groove formed on a surface of said substrate along a predetermined track which the light beam is made to follow; and
   a recording layer formed on the surface of said substrate, to which the information is recorded by the light beam,
   wherein a depth of said groove is prescribed such that an amount of the return light from said groove becomes smaller than an amount of the return light from the portion of said recording layer other than said groove in a condition after recording.

2. A recordable optical disk according to claim 1, wherein said recording layer comprises phthalocyanine dye.

3. A recordable optical disk according to claim 1, wherein the portion of said recording layer other than said groove comprises a land portion.

4. A recordable optical disk according to claim 1, wherein the depth of said groove is prescribed such that an average value of a RF signal at said groove is smaller than a value of a RF signal at the portion of said recording layer other than said groove.

5. A recordable optical disk according to claim 1, wherein the information is recorded in said groove as a pit array.

6. A recordable optical disk according to claim 1, wherein said recordable optical disk comprises a recordable LD (Laser Disk).

7. A method of manufacturing a recordable optical disk, to which information is optically recorded by a light beam and from which a return light is received to produce a tracking error signal, said method comprising the steps of:
   preparing a substrate having a disk shape;
   forming a groove on a surface of said substrate along a predetermined track which the light beam is made to follow; and
   forming a recording layer on the surface of said substrate, to which the information is recorded by the light beam,
   wherein a depth of said groove is prescribed such that an amount of the return light from said groove becomes smaller than an amount of the return light from the portion of said recording layer other than said groove in a condition after recording.

8. A method according to claim 7, wherein, in the recording layer forming step, said recording layer is formed of phthalocyanine dye.

9. A method according to claim 7, wherein, in the groove forming step, the depth of said groove is prescribed such that an average value of a RF signal at said groove is smaller than a value of a RF signal at the portion of said recording layer other than said groove.

10. A method according to claim 7, further comprising the step of recording the information to said recording layer in said groove as a pit array.

* * * * *